(12) United States Patent
Sipher et al.

(10) Patent No.: US 8,896,621 B1
(45) Date of Patent: Nov. 25, 2014

(54) USER-MANIPULABLE STENCILS FOR DRAWING APPLICATION

(75) Inventors: Joseph K. Sipher, Sunnyvale, CA (US); Brook Lenox, Missoula, MT (US)

(73) Assignee: Pinger, Inc., San Jose, CA (US)

( * ) Notice: Subject to any disclaimer, the term of this patent is extended or adjusted under 35 U.S.C. 154(b) by 597 days.

(21) Appl. No.: 12/792,593

(22) Filed: Jun. 2, 2010

(51) Int. Cl.
*G09G 5/00* (2006.01)

(52) U.S. Cl.
USPC ........... 345/619; 345/418; 345/441; 345/661; 715/762; 715/763; 715/764

(58) Field of Classification Search
CPC ......... G06T 11/20; G06T 11/60; G06T 11/80; G06F 3/0488; G06F 3/041; G06F 3/048; G06F 17/242
USPC ................. 345/418, 581–619, 173, 441, 661; 715/773, 762–764
See application file for complete search history.

(56) References Cited

U.S. PATENT DOCUMENTS

| | | | | |
|---|---|---|---|---|
| 2003/0104343 A1* | 6/2003 | Rehkemper et al. | ............ | 434/85 |
| 2004/0046769 A1* | 3/2004 | Arvin et al. | .................. | 345/619 |
| 2006/0001650 A1* | 1/2006 | Robbins et al. | ............... | 345/173 |
| 2010/0171754 A1* | 7/2010 | Hatfield et al. | ............... | 345/619 |
| 2011/0175821 A1* | 7/2011 | King | .............................. | 345/173 |
| 2011/0191334 A1* | 8/2011 | Hua et al. | ...................... | 707/726 |

* cited by examiner

*Primary Examiner* — Ke Xiao
*Assistant Examiner* — Kim-Thanh T Tran
(74) *Attorney, Agent, or Firm* — Raubvogel Law Office

(57) ABSTRACT

A drawing application provides functionality for assisting the user in performing freehand drawing. The user can place virtual stencils on the screen, and can manipulate the stencils in various ways. The stencils can be used as guides for freehand drawing and/or to transform freehand drawings into more precise shapes. In general, the stencils do not form part of the final graphical document being created (or edited), but are used to assist the creation (or editing) of the document, in a manner that is analogous to the use of physical stencils in when drawing on paper or other physical medium. The stencils can be used for straightening lines, for constraining the effect of drawing or painting, and/or as a visual guide for performing any drawing operations. The user can cause the stencils to be dismissed and/or hidden at any time, so that the graphical document can be viewed without the overlaying stencils.

56 Claims, 15 Drawing Sheets

USER-MANIPULABLE STENCILS FOR DRAWING APPLICATION

FIELD OF THE INVENTION

The present invention relates to software applications for drawing, and more particularly to systems and methods for providing user-manipulable stencils that can be used as drawing guides in such software applications.

DESCRIPTION OF THE RELATED ART

Software applications for drawing allow users to draw, doodle, and create different types of graphical, visual, and/or artistic works. Such works, referred to herein as "graphical documents", can be displayed on a screen, printed, transmitted to other users, uploaded, stored, and/or edited.

Drawing applications usually operate on a computing device having a screen and an input device. The input device may be a mouse, trackball, touchpad, touchscreen, or the like, so as to allow the user to specify locations on the screen where drawing should occur. For example, a touchscreen may be provided that acts as both an input and output device, and that provides direct manipulation by allowing a user to simply touch the screen (either with a finger or a stylus) at the location where a drawing operation should occur. The drawing operation thus resembles finger-painting. In other computing environments, an on-screen cursor may be controlled by a stylus, mouse or other pointing device to allow a user to draw on the screen; the drawing takes place at the cursor location.

Using such input and output devices, drawing applications allow for freehand drawing of shapes, words, and the like on a computing system, according to the user's desires and his or her artistic ability. Generally, such drawing applications provide a variety of different tools to allow users to engage in different types of freehand drawing activities. For example, users can select among different types of paintbrushes, line thicknesses, colors, and the like, depending on their personal preferences and depending on the particular work they are trying to create. The user selects a drawing tool, and then uses the touch screen or other input device to perform freehand drawing.

Drawing applications also often provide the ability to place predefined shapes on the screen, and to manipulate such shapes according to the user's wishes. For example, the user can select a shape, such as a rectangle, and drag it to a location on the screen; the user may also be able to resize, rotate, and reposition the shape as he or she sees fit, and to specify various characteristics for the shape, such as its color, line thickness, opacity, and the like. Many drawing applications provide access to such functionality by way of palettes, menus, keyboard commands, pop-up menus, and/or some combination thereof. Such predefined shapes are generally designed to be used as elements of the graphical work being created, and are output as part of the final graphical document.

Once a user has completed the graphical document, using freehand drawing, predefined shapes, or a combination thereof, he or she can view the document on the screen, save it to an electronic medium such as disk, upload it, transmit it to others via network-enabled communications means, and/or print it out on a printer.

SUMMARY

According to various embodiments of the present invention, a drawing application provides functionality for assisting the user in performing freehand drawing. In one embodiment, the user can place virtual stencils on the screen; these stencils can then be used as guides for freehand drawing and/or to transform freehand drawings into more precise shapes. In general, the stencils do not appear as part of the final graphical document being created (or edited), but are merely used as guides and drawing aids during the creation (or editing) of the document, in a manner that is analogous to the use of physical stencils in when drawing on paper or other physical medium. The stencils can be used for straightening lines, for constraining the effect of drawing or painting, and/or as a visual guide for performing drawing operations. The user can cause the stencils to be dismissed and/or hidden at any time, so that the graphical document can be viewed without the overlaying stencils.

In various embodiments, stencils can be configured to automatically transform the user's drawings in various ways, and/or to function as visual guides for drawing.

In one embodiment, stencils can help the user draw straight lines or geometric shapes by transforming a user-drawn line or shape into a more precise rendition, as follows:

- If the user draws a line along a ruler stencil or along a straight edge of a shape defined by a stencil, the stencil transforms the user's line into a straight line; the length of the straight line is substantially equal to the length of the user-drawn line.
- If the user draws a line along a curved or arbitrarily shaped edge of the stencil shape, the user's line is transformed into a line matching the curve of arbitrary shape along the proximate stencil edge; the length of the new line is substantially equal to the length of the user-drawn line.

In another embodiment, stencils can operate to cause drawing operations to only affect certain portions of the graphical document, while leaving other portions of the document untouched. For example, scribbling after placing a stencil having a distinctive shape can leave a graphical element that resembles the distinctive shape, while still affording the user with the artistic freedom as to the manner of the scribbling, as follows:

- In one mode, if the user scribbles or draws so that some of the scribbling/drawing is within the stencil shape and some is outside the stencil shape, the stencil transforms the user's work by deleting or ignoring that portion of the scribbling/drawing outside the shape, while allowing the scribbling/drawing within the shape to remain.
- In another mode, if the user scribbles or draws so that some of the scribbling/drawing is within the stencil shape and some is outside the stencil shape, the stencil transforms the user's work by deleting or ignoring that portion of the scribbling/drawing inside the shape, while allowing the scribbling/drawing outside the shape to remain.

Alternatively, stencils can be configured so that they do not have any transformative effect on drawing or painting operations. Rather, the stencils can be configured as guides only, for the user to follow or ignore as he or she sees fit.

Any of the above-described modes of operation can be used in combination with one another. In one embodiment, the user can select what type of effect(s), if any, various stencils have, and how they should operate.

In various embodiments, stencils can be selected from a palette of available stencils. The user can place stencils on the screen via direct manipulation or by some other means, and can resize, rotate, and/or distort stencils as desired. Any number of stencils can be placed concurrently, and stencils can be overlaid on one another according to the user's wishes. Stencils can be dismissed, hidden, saved, and/or temporarily disabled as desired. When saving a drawing in progress, the user can save electronic representations of stencils as meta-data to accompany the saved representation of the drawing, so that the user can later retrieve the drawing, cause the stencils to be displayed, and continue where he or she left off.

Stencils can be of any shape. Examples include rulers (for guidance in drawing a straight line), circles, polygons, or arbitrary decorative shapes. The particular type of manipulation that can be performed on a stencil may depend on the shape of the stencil.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

Figure 1:
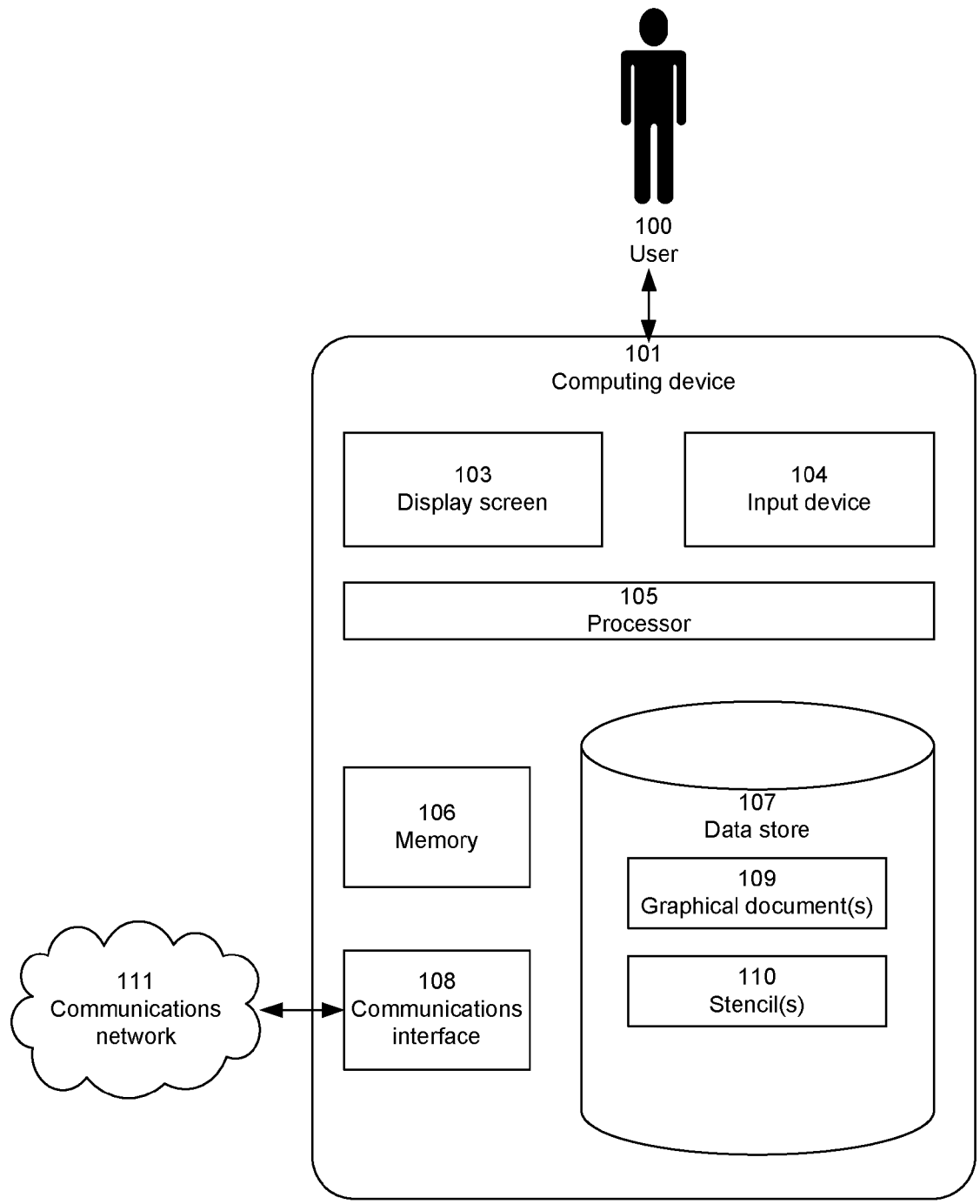
FIG. 1 is a block diagram depicting an architecture for practicing the present invention according to one embodiment.

For purposes of the following description, the term "graphical document" refers to any file, document, or work that can be created and/or edited by an electronic computing device, and that includes at least one graphical component. The graphical document may include shape(s), painted element(s), drawn object(s), text, photograph(s), background(s), and/or any combination thereof. The term "graphical document" may variously refer to the document itself, its representation (or a portion thereof) on a display screen, and/or its representation as a file on a storage device of a computing system. Its representation as a digital file can be in any format, including for example bitmap (BMP), Joint Photographic Experts Group (JPG), Graphic Interchange Format (GIF), Portable Network Graphics (PNG), or the like. One having skill in the art will recognize that the term "graphical document" may refer to a portion of a document or an entire document.

According to various embodiments of the present invention, user-manipulable stencils are provided for assistance in generating graphical documents using a drawing software application. The stencils are displayed on a display screen of a computing device. The user can change various characteristics of these stencils, for example by resizing, rotating, and/or moving them. The user can use the stencils as a guide for drawing operations performed within the software application. Stencils can be configured so that they perform various transformations on the user's drawn work. For example, they may straighten crooked lines drawn by the user, replace crude lines and shapes with more precise renditions, and/or constrain drawing operations from affecting certain portions of the graphical document. Alternatively, stencils can be configured so that they do not have any effect on drawing operations but are merely presented as a guide for the user.

Stencils be configured so that they are displayed on the screen and dismissed from the screen according to the user's wishes, but do not generally appear on the finished output. In various embodiments, users can cause stencils to be dismissed, hidden, toggled, displayed, manipulated, resized, rotated, and/or reconfigured, as desired.

System Architecture

According to various embodiments, the present invention can be implemented on any electronic device, such as a handheld computer, personal digital assistant (PDA), personal computer, kiosk, cellular telephone, or the like. In various embodiments, the invention can be implemented as a feature of a drawing application running on such a device.

One skilled in the art will recognize, however, that in other embodiments the invention can be practiced in other contexts, including any environment in which it is useful to provide a stencil or on-screen guide for drawing. Accordingly, the following description is intended to illustrate various embodiments of the invention by way of example, rather than to limit the scope of the claimed invention.

For illustrative purposes, and for greater clarity, the invention will be described herein in terms of a mobile device that includes a touchscreen, referring to a touch-sensitive screen that permits the user to initiate commands by direct manipulation, for example by touching (with a finger or stylus) various areas on the screen. One skilled in the art will recognize, however, that the description provided herein is merely exemplary, and that the invention can be implemented in other embodiments wherein other mechanisms are used for controlling drawing operations, such as an onscreen cursor that is controlled by a pointing device such as a mouse, keyboard, trackball, or the like. In one embodiment, the present invention is implemented as a software application running on a touchscreen based mobile device such as an iPhone or iPad, available from Apple Inc. of Cupertino, Calif. Alternatively, the techniques described herein can be implemented on any other type of mobile device or other electronic device, including for example a laptop or desktop computer running an operating system such as MacOS, available from Apple Inc. of Cupertino, Calif., or Microsoft Windows 7, available from Microsoft Corporation of Redmond, Wash.

Referring now to FIG. 1, there is shown a block diagram depicting an architecture for practicing the present invention according to one embodiment. The techniques of the present invention can be implemented in a software application running on computing device 101 according to well-known techniques. Computing device 101 may be any electronic device adapted to run software for performing drawing operations; for example, computing device 101 may be a desktop computer, laptop computer, personal digital assistant, smartphone, music player, handheld computer, tablet computer, kiosk, game system, or the like. In one embodiment, computing device 101 is a smartphone having computing capabilities, such as the iPhone 3GS available from Apple Inc. of Cupertino, Calif., or a tablet computer such as the iPad, also available from Apple Inc. of Cupertino, Calif. Software for performing drawing operations can be loaded onto computing device 101 and run thereon, under the direction of user 100.

Processor 105 is a conventional microprocessor for running such software. Memory 106 is random-access memory for use by processor 105 in the course of running software on device 101. Communications interface 108 is a hardware component that allows computing device 101 to communicate via a communications network 111 such as the Internet and/or a cell-phone communications network. For example, completed graphical documents can be transmitted to other users, remote output devices, servers, remote storage devices, and the like, via communications network 111.

Computing device 101 also includes display screen 103 and input device 104. In one embodiment, display screen 103 and input device 104 are combined into a single hardware component such as a touch-sensitive screen (touchscreen), providing a mechanism for direct manipulation of on-screen elements in response to the user making contact with various areas of the screen, either with a finger or with a stylus. Such touchscreens can include multi-touch capability, allowing the user to provide input that includes two or more touch points on display screen 103. As is well known in the art, input capabilities of device 104 allow for manipulation and activation of various onscreen objects by way of tapping, dragging, flicking, pinching, and the like. Alternatively, input device 104 can be a separate hardware element from display screen 103, including for example a keyboard, pointing device (such as mouse, trackpad, trackball, or touch-sensitive pad), joystick, roller switch, five-way switch, or the like, or any combination thereof. Accordingly, in the description provided herein, it is assumed that the various input operations are performed using whatever input device is available and appropriate in connection with the software application being used and the task being performed.

Computing device 101 may also include data store 107 for local storage of graphical documents 109. Under the direction of user 100, computing device 101 can cause a graphical document to be stored in data store 107, retrieved from data store 107, and/or deleted from data store 107. Data store 107 may be implemented as a hard drive, optical drive, flash drive, or the like. Data store 107 may be an integrated component of computing device 101 or it may be external or even remote. In one embodiment, data store 107 can also store software code for running the drawing application. In one embodiment, data store 107 can also store stencils 110.

User 100 may purchase or obtain a drawing application including a set of stencils 110. The application and/or stencils 110 can be obtained, for example, from an online store and downloaded directly into data store 107 of computing device 101. According to the user's commands, stencils 110 can be retrieved from data store 107, manipulated and/or utilized according to the techniques described herein. Graphical documents 109 can be stored in data store 107 after they have been completed, or while in progress, allowing the user to later retrieve them and continue to work on them.

One skilled in the art will recognize that the particular arrangement of hardware elements shown in FIG. 1 is merely exemplary, and that the present invention can be implemented using different hardware elements configured in any of a number of different ways.

Method of Operation

Figure 2:
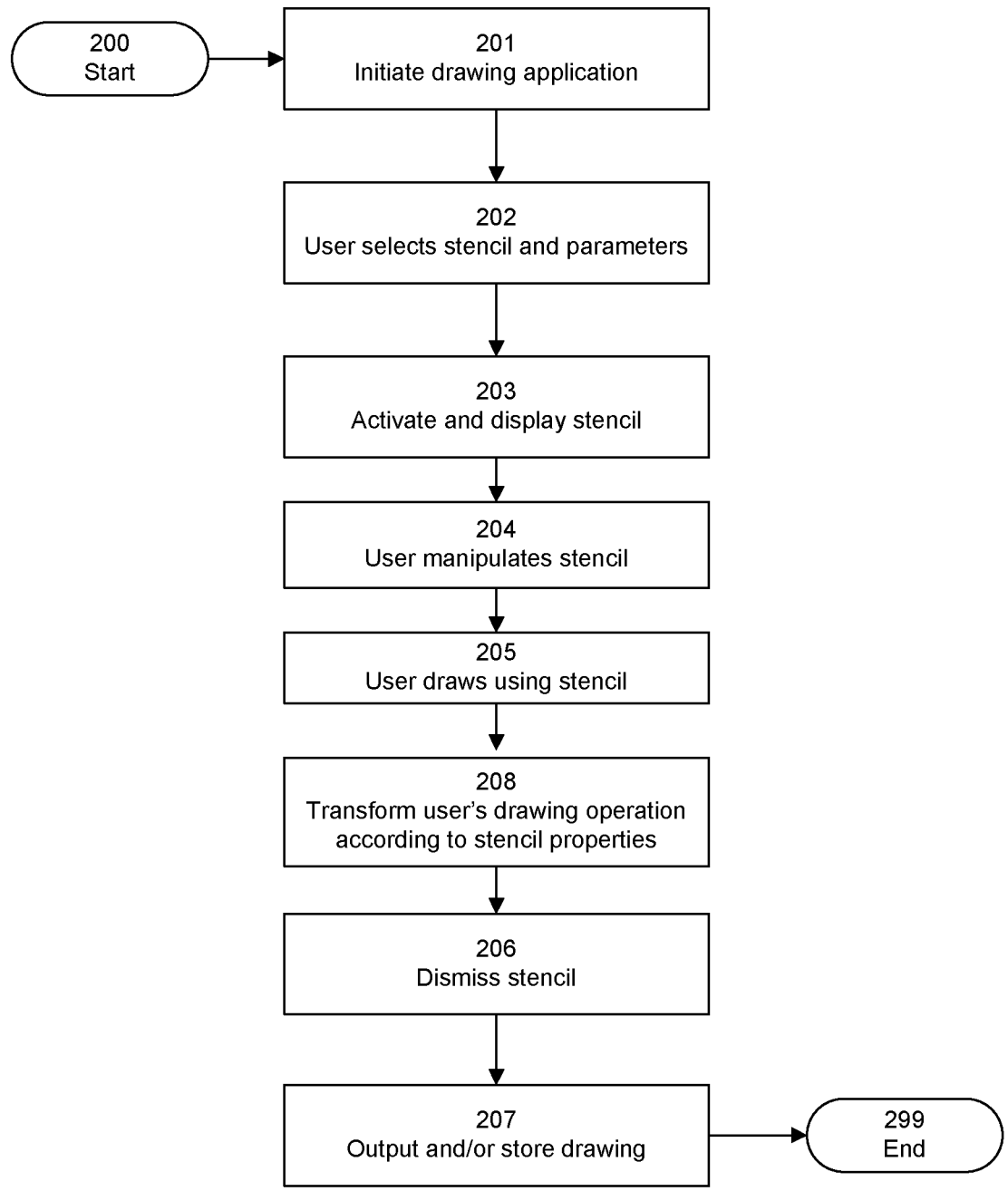
FIG. 2 is a flow diagram depicting a method for practicing the present invention according to one embodiment.

Referring now to FIG. 2, there is shown a flow diagram depicting a method for practicing the present invention according to one embodiment.

User 100 initiates 201 a drawing application on computing device 101. For example, user 100 may launch a drawing application from a home screen showing icons representing various applications that are available for use. The drawing application is then loaded into memory 106 and run by processor 105. The drawing application may have built-in stencil functionality, or such functionality can be provided as an add-on or plug-in for the drawing application. In one embodiment, the drawing application may load from a server and run within a browser, for example if it is implemented as a web-based application.

Depending on the user's wishes and on the configuration of the drawing application, a new, blank graphical document 109 may be opened, or a previously generated graphical document 109 may be retrieved from data store 107 and opened for editing.

User 100 can perform various conventional drawing operations before, during or after the use of stencil 110. For example, user 100 may use a pencil tool to draw some shapes, and then may activate, use, and dismiss one or more stencils 110 as described herein, and then may use a paintbrush tool to perform painting operations according to well-known techniques. Thus, the stencils 100 described herein, and their use in connection with the present invention, can, in one embodiment, constitute a subset of a larger set of drawing tools that are made available by a drawing application running on computing device 101.

Figure 3A:
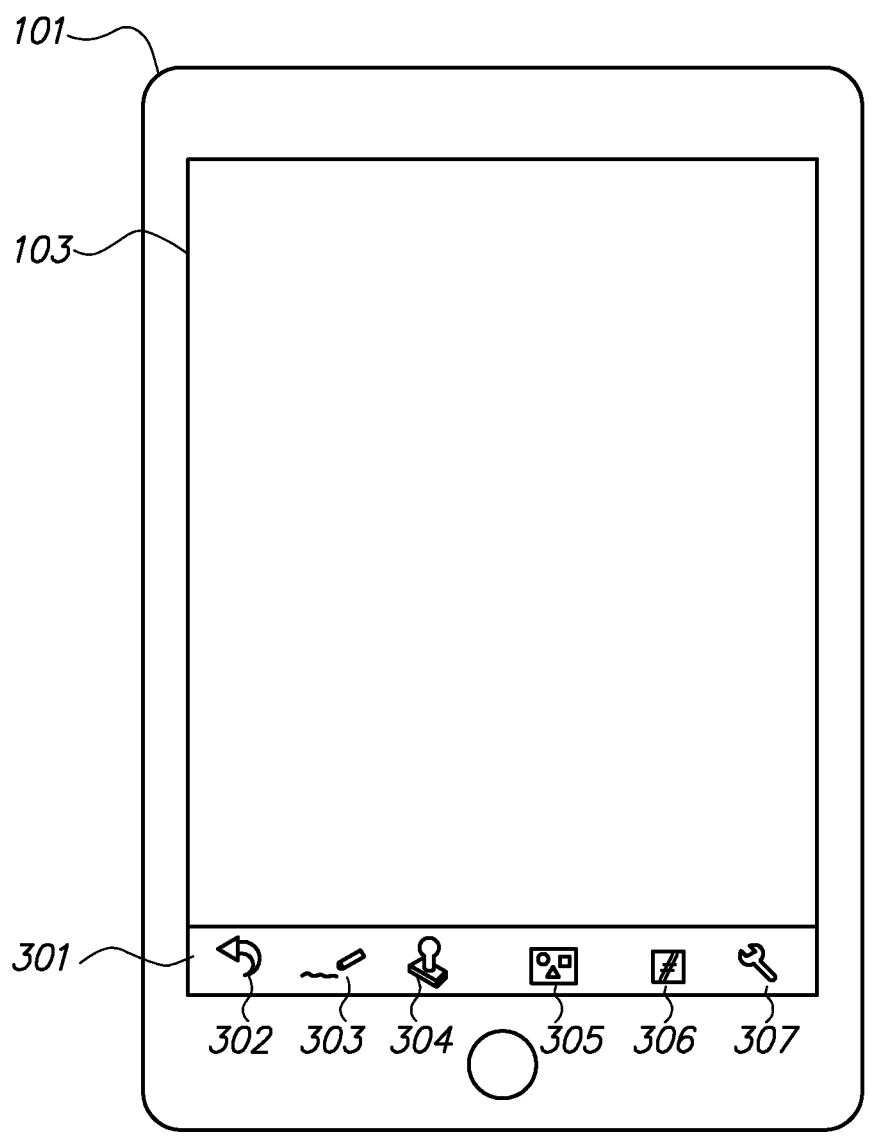
FIG. 3A is a screen shot depicting the appearance of a display screen after a drawing application has been launched, according to one embodiment.

Referring also to FIG. 3A, there is shown an example of the appearance of display screen 103 after the drawing application has been launched on device 101 having a touchscreen 103, and a blank graphical document 109 is displayed. In the example, toolbar 301 is shown, including tools 302-307 for performing various operations on graphical document 109. In the example, the drawing application is controlled by interacting with touchscreen 103; for example, user 100 can select an operation to be performed on document 109 by tapping on a tool 302-307 in toolbar 301. The example of FIG. 3A depicts an undo tool 302, a pencil tool 303, a stamp tool 304, a stencil tool 305, a background selection tool 306, and a preferences tool 307; one skilled in the art will recognize that any other tools can be presented, and that the tools depicted in FIG. 3A are merely exemplary. Other tools include erasers, distortion effects, text entry tools, scaling effects, smudge tools, and the like.

Figure 3B:
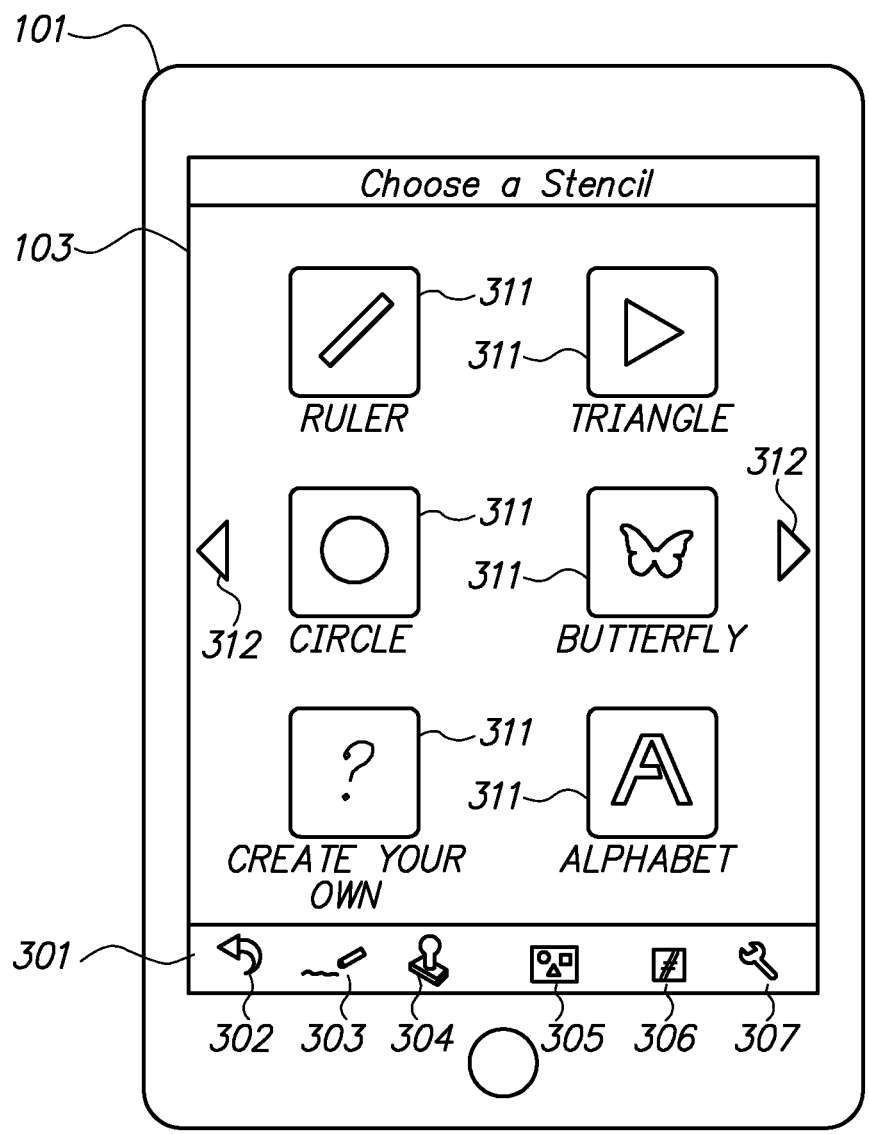
FIG. 3B is a screen shot depicting a display for selecting among a plurality of available stencils, according to one embodiment.

For example, user 100 may tap stencil tool 305 to cause a menu or palette of available stencils 110 to be displayed. Referring also to FIG. 3B, there is shown an example of a screen shot containing icons 311 representing various stencils 110. User 100 can select and activate a stencil 110, for example by tapping its corresponding icon 311. Many different types of stencils 110 can be provided, including various shapes; stencils 110 represented by icons 311 in FIG. 3B are merely exemplary. As shown in FIG. 3B, some icons 311 may provide access to functionality by which user 100 can create his/her own stencil 110, for example by drawing on the screen; user 100 can save a user-created stencil 110 for later use, and can even upload the user-created stencil 110 to a server or other repository so that it can be made available to other users.

In one embodiment, scroll arrows 312 or some other mechanism may be provided to allow user 100 to scroll through the display of icons 311 and thereby gain access to more stencils 110.

Stencils 110 can be of any shape. Examples include rulers (for guidance in drawing a straight line), circles, polygons, and/or arbitrary decorative shapes. The particular type of manipulation that can be performed on a stencil may depend on the shape of the stencil. Stencils 110 can contain any number of contiguous and/or noncontiguous elements.

Once user 100 has selected 202 a stencil 110, for example by tapping on its corresponding icon 311, the selected stencil 110 is activated and displayed 203 on screen 103. Stencil 110 can be displayed at a default location and can have certain default characteristics such as size or orientation. These defaults can be pre-set, or configured by the user, or they can be based on a previous state for stencil 110, such as for example the most recent location, size, and orientation of stencil 110 when it was last used by user 100. In one embodiment, more than one stencil 110 can be active and displayed at the same time; the multiple stencils 110 can be placed at different locations on screen 103, or they can overlap as appropriate.

Figure 3C:
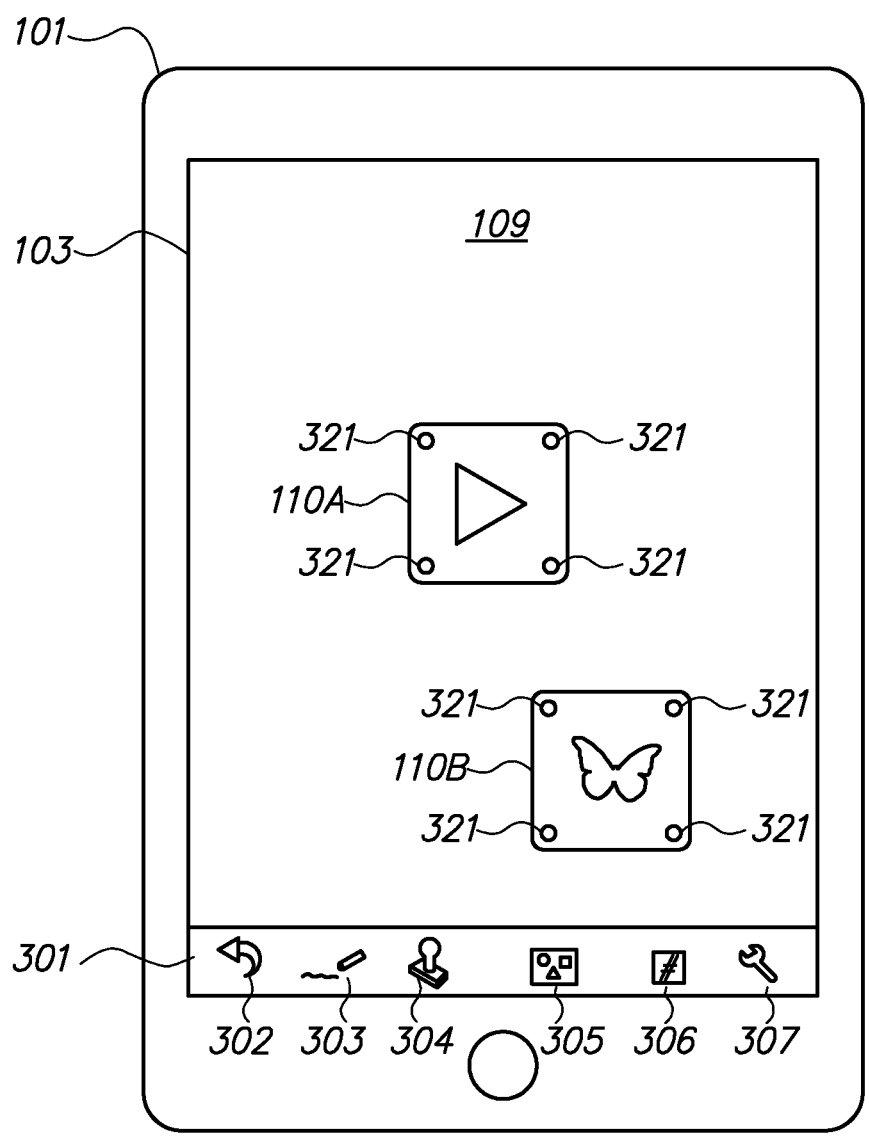
FIG. 3C is a screen shot depicting two active stencils, according to one embodiment.

Referring also to FIG. 3C, there is shown an example of a screen shot with two active stencils 110: triangle stencil 110A and butterfly stencil 110B, both positioned on graphical document 109.

User 100 can manipulate 204 any active stencil 110 by changing any of its characteristics. Stencil 110 manipulation 204 is optional; user 100 can, if he or she wishes, leave stencil 110 in its current location and configuration on display screen 103. If user 100 does choose to manipulate 204 stencil 110, such manipulations can include, for example, repositioning, resizing, rotating, distorting, and the like. In one embodiment, user 100 can reposition (move) stencil 110 by dragging it from one location to another on screen 103. In one embodiment, stencils 110 can include handles 321 that act as control points for resizing, rotating, and/or distorting stencils 110; user 100 manipulates 204 stencil 110 by dragging handles 321 in various ways. In embodiments where touchscreen 103 has multi-touch capability, user 100 can manipulate 204 stencil 110 by dragging two or more handles 321 simultaneously. Thus, handles 321 can be provided as a means for user 100 to distinguish between repositioning operations and other types of manipulations of stencils 110.

In other embodiments, handles 321 can be omitted, and user 100 can manipulate 204 stencil 110 by dragging edges of stencil 110 or by performing other direct manipulations on stencil 110. Alternatively, the software application can make inferences as to the type of manipulation user 100 intends to perform based on the type of input provided; for example, if the user drags with a single finger, the input can be interpreted as a reposition command, whereas if the user pinches apart with two fingers, the input can be interpreted as a resizing command. Manipulation can also be distinguished from drawing operations based on the type of input: a finger drag that begins outside the active area of a stencil 110 (i.e., outside the shape itself) can be considered a reposition command, whereas a finger drag that begins within the active area (i.e., inside the shape) can be considered a draw command, even if it later extends beyond the active area of stencil 110.

Alternatively, stencil 110 manipulation 204 can be performed using onscreen menus, keyboard commands, or any other input mechanism. Additional details and examples of stencil 110 manipulation 204 are provided below, in connection with FIGS. 4A through 5B.

Figure 3D:
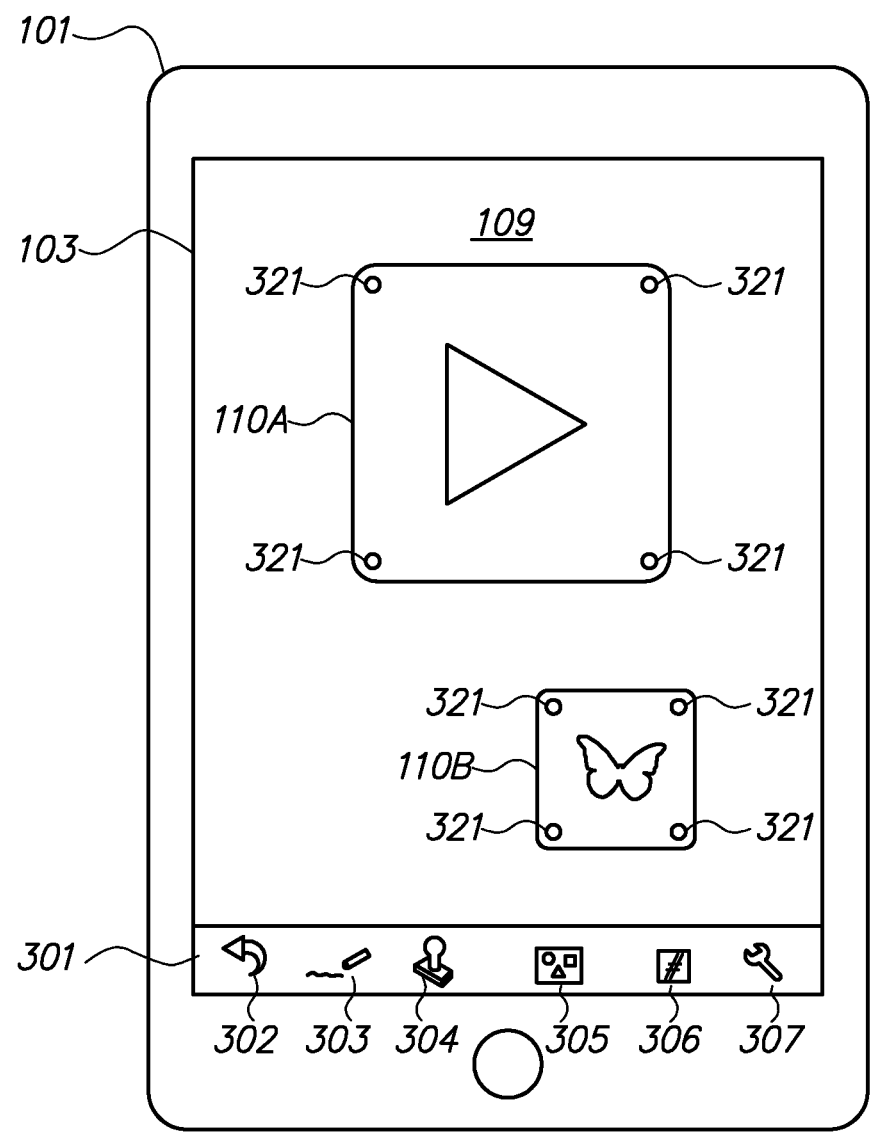
FIG. 3D is a screen shot depicting two active stencils after one stencil has been resized, according to one embodiment.

Referring also to FIG. 3D, there is shown an example of a screen shot after user 100 has manipulated triangle stencil 110A by resizing it. Butterfly stencil 110B is unchanged.

User 100 then draws 205 using stencil 110 as a guide. Any desired drawing operation can be performed, including for example painting using a virtual paintbrush, scribbling or writing using a virtual pen, placing images from virtual stamp pads, applying visual effects, and the like. Additional details concerning the operation of stencils 110 are set forth below.

User's 100 drawing operation can optionally be transformed 208 according to properties of stencil 110. Stencils 110 can operate in different ways to transform user's 100 drawing operation. For example, stencils 110 can straighten lines, make user's 100 drawing operations conform to stencil's 110 shape, block user's 100 drawing operations from affecting certain areas of document 109, or the like. Such transformations can take place while user 100 is drawing, and/or in response to any trigger event, such as after user 100 completes a drawing operation, and/or upon user 100 activation of a command, and/or after stencil 110 is dismissed, and/or at any other time. Alternatively, stencils 110 can operate to constrain the area of document 109 affected by user's 100 drawing operations. Alternatively, stencils 110 can be configured to have no effect on user's 100 drawing operations, serving solely as a guide. Additional details concerning the operation of stencils 110 according to various embodiments are provided below.

In one embodiment, stencils 110 can be hidden (so that they are temporarily removed from the display) or dismissed (so that they are more permanently removed). For example, hidden stencils 110 can preserve their state (such as size, position, orientation, and other characteristics) so that when they are brought back into view, they retain that state.

User 100 can dismiss 206 or hide stencil(s) 110 at any time, either after finishing all drawing operations or when he or she wishes to see the current state of document 109. In one embodiment, a toggle is provided to easily switch between viewing and hiding stencils 110; for example, the user can hold down a button to temporarily hide all stencils 110. In one embodiment, individual stencils 110 can be viewed or hidden independently of one another.

In one embodiment, a temporary override mode can be provided, wherein user 100 can disable stencils 110 without necessarily hiding them from screen 103. Thus, stencils 100 still appear (although in one embodiment they may be shown grayed out or with some other distinctive visual characteristic), but they have no effect on drawing operations until the override is lifted.

Document 109 can be output 207 (for example, on a printer or other device), stored in data store 107, transmitted via communications network 111, or any combination thereof. In one embodiment, a representation of stencils 110 used in creating document 109 can be electronically stored (or transmitted) along with document 109. In this manner, if document 109 is reopened for further editing, either by user 100 or by another user, stencils 110 can be made available for use during such editing. Such stencil 110 data can be stored, for example, as meta-data that accompanies an electronic representation of the image content in document 109. In one embodiment, user 100 can specify whether or not such metadata should accompany the transmitted or stored version of document 109.

Operation of Stencils

Referring now to FIGS. 3E through 3K, there are shown various examples of different ways that stencils can operate. According to the techniques of the present invention, stencils 110 can be configured to operate in any of a number of different ways. In one embodiment, user 100 can select which mode of operation applies to each stencil 110. In various embodiments, these mechanisms of operation for stencils 110 include:

Conforming User-Drawn Lines to Stencil Shape:

If the user draws a line along a straight edge of the stencil shape, the user's line is transformed into a straight line; the length of the new line is substantially equal to the length of the user-drawn line. Similarly, if the user draws a line along a curved or arbitrarily shaped edge of the stencil shape, the user's line is transformed into a line matching the proximate stencil edge; the length of the new line is substantially equal to the length of the user-drawn line. Thus, a user's drawing along the edge of the stencil's shape is transformed so that it conforms more precisely to the stencil's shape, or to a portion thereof.

Figure 3E:
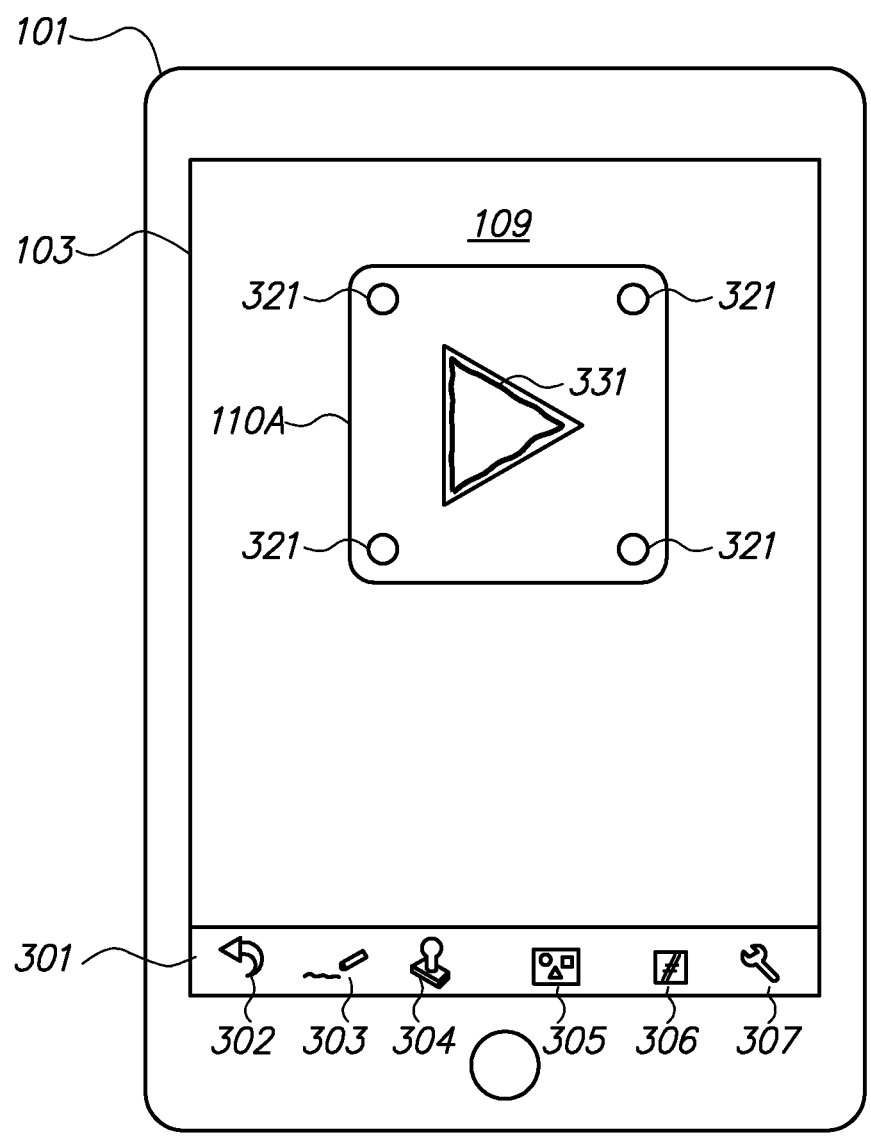
FIG. 3E is a screen shot depicting a user's drawing operation on a graphical document using a triangle stencil, according to one embodiment.
Figure 3F:
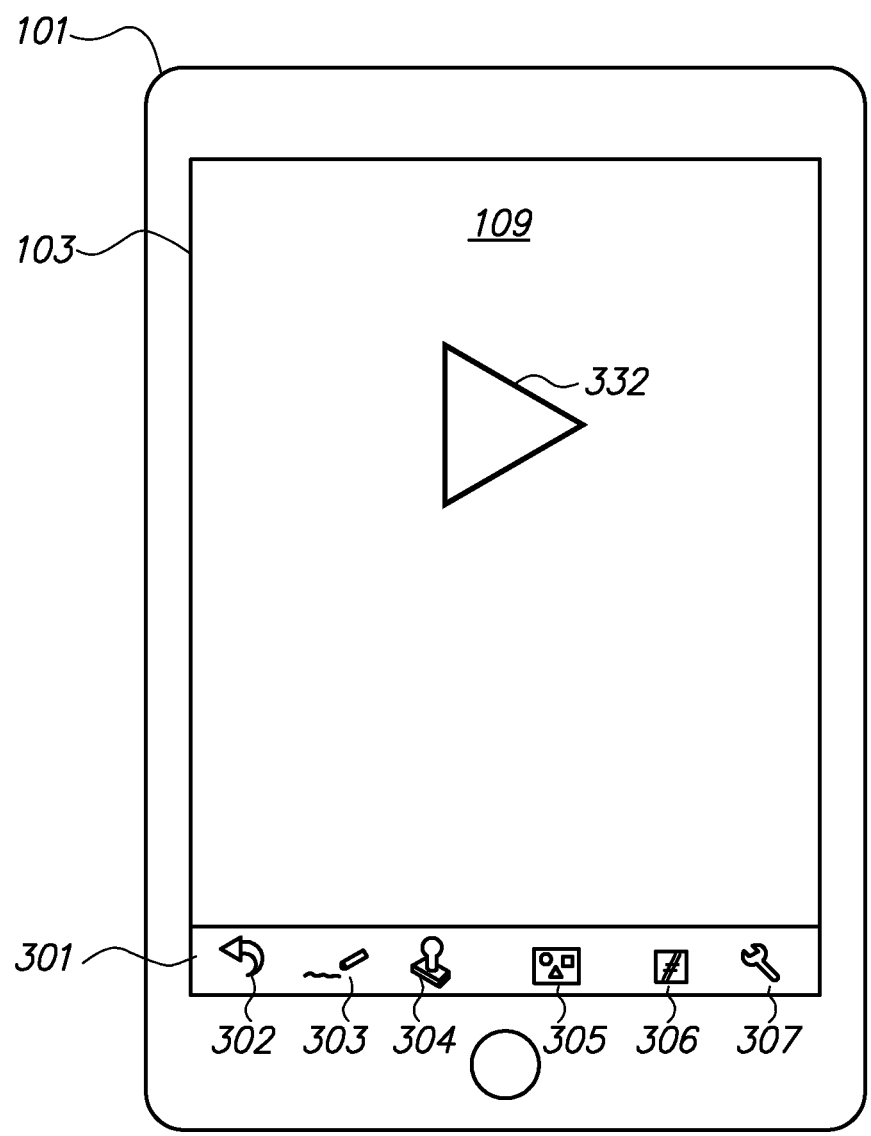
FIG. 3F is a screen shot depicting an example of the graphical document after the triangle stencil has transformed the user-drawn triangle, according to one embodiment.

For example, in FIG. 3E, user draws crude triangle 331, using triangle stencil 110A as a guide. In FIG. 3F, stencil 110A has been dismissed or hidden, and crude triangle 331 is transformed into a more precise triangle 332. In one embodiment, stencil 110A operates to transform crude triangle 331 into precise triangle 332 when user drawing operations are detected sufficiently close to the edge of the shape defined by stencil 110A. Thus, drawing near the center of the triangle might remain unaffected, while drawing along or near an edge of the triangle is interpreted as a user attempt to draw a triangle, causing the drawing operation to be transformed. In one embodiment, if user 100 draws only a portion of crude triangle 331, then the portion is transformed into a corresponding portion of precise triangle 332. In one embodiment, if user 100 draws a line along one edge of the triangle shape defined by stencil 110A, that line is transformed into a more precise line of similar length, defined by the corresponding portion of the triangle shape defined by stencil 110A.

In this manner, stencils 110 operates to detect user's 100 likely intention(s) and to transform drawing operations, by causing drawn objects to conform more precisely to a shape defined by stencil 110.

Such transformation can take place for any type of stencil 110 and for any shape. In general, user 100 draws an element, and then a trigger event causes that drawn element to be transformed into a rendition that more precisely matches the shape defined by stencil 110. Alternatively, the transformation can take place in real-time, while user 100 is drawing the element, as described below.

Figure 3G:
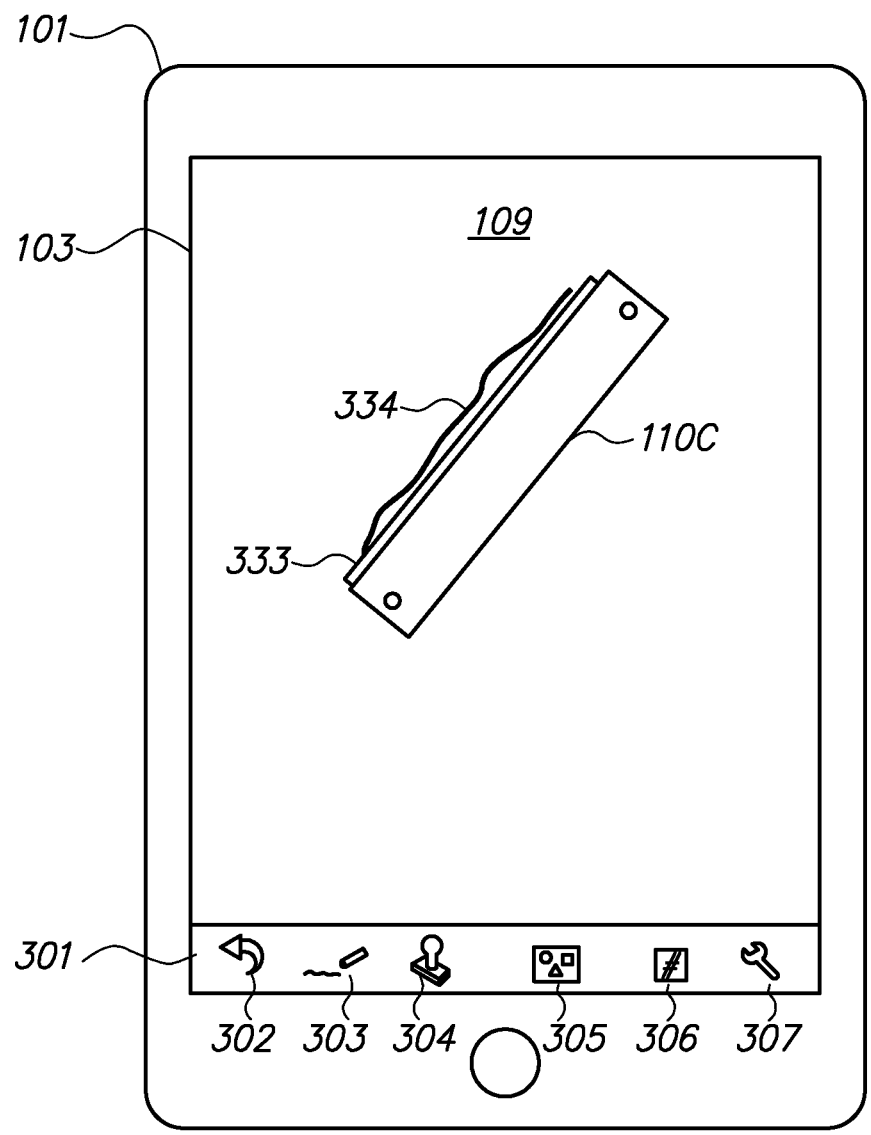
FIG. 3G is a screen shot depicting a user's drawing operation on a graphical document using a straight edge of a ruler stencil, according to one embodiment.
Figure 3H:
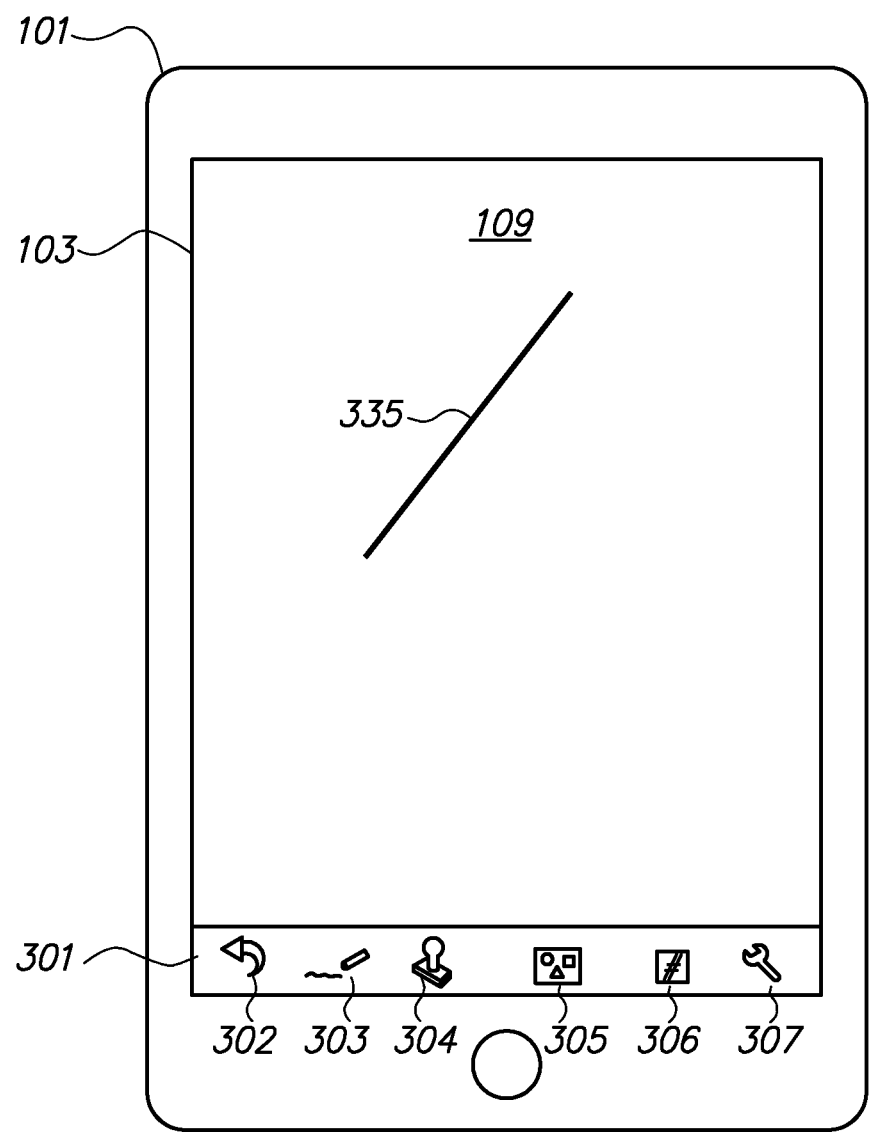
FIG. 3H is a screen shot depicting an example of the graphical document after the ruler stencil has transformed the user-drawn line, according to one embodiment.

Referring now to FIGS. 3G and 3H, there is shown another example of the straightening functionality. In FIG. 3G, user 100 draws a line 334 alongside straight edge 333 of ruler stencil 110C. Ruler stencil 110C transforms line 334 into straight line 335. FIG. 3H depicts straight line 335 after the transformation has taken place and stencil 110C has been dismissed.

In various embodiments, for any stencil 110, the timing of the transformation can be configured in various ways. For example, the transformation can take place substantially instantaneously as user 100 draws on screen 103. Alternatively, the transformation can take place in response to some trigger event, such as user 100 dismissing or hiding stencil 110, or user 100 completing the drawing of the shape specified by stencil 110 (or some portion thereof), or user 100 activation of a command. In one embodiment, the transformation is performed in response to a pause of sufficient length during a drawing operation; thus, if user 100 draws along a stencil 110 edge, and then pauses for some period of time (such as, for example, at least half a second), the drawn element is transformed into the more precise rendering according to the stencil 110. In one embodiment, user 100 can cause the drawing application to undo the operation of stencil 110, or even to toggle between the original drawn element and the transformed version at will.

Constraining Area Affected by Drawing Operations:

In one embodiment, stencil 110 can be configured to constrain the area affected by drawing or scribbling operations. Thus, if the user scribbles or draws on an area of document 109 that includes regions within stencil 110 shape and regions outside of stencil 110 shape, the stencil causes the scribbling/drawing within the shape to remain, while the scribbling/drawing outside the shape is ignored or deleted. Conversely, stencil 100 can be configured so that the scribbling/drawing outside the shape remains, while the scribbling/drawing within the shape is ignored or deleted.

In one embodiment, constraining is implemented by simply ignoring drawing operations outside the region defined by stencil 110, while stencil 110 is active. In another embodiment, constraining is implemented by transforming the drawn elements in response to a trigger event; for example, when user 100 pauses, or finishes a drawing operation, or dismisses stencil 110, or performs some other action, those portions of the drawn elements outside the region defined by stencil 110 are removed from document 109. The user can undo the operation, if desired, and/or toggle between the original and transformed drawing elements.

Figure 3I:
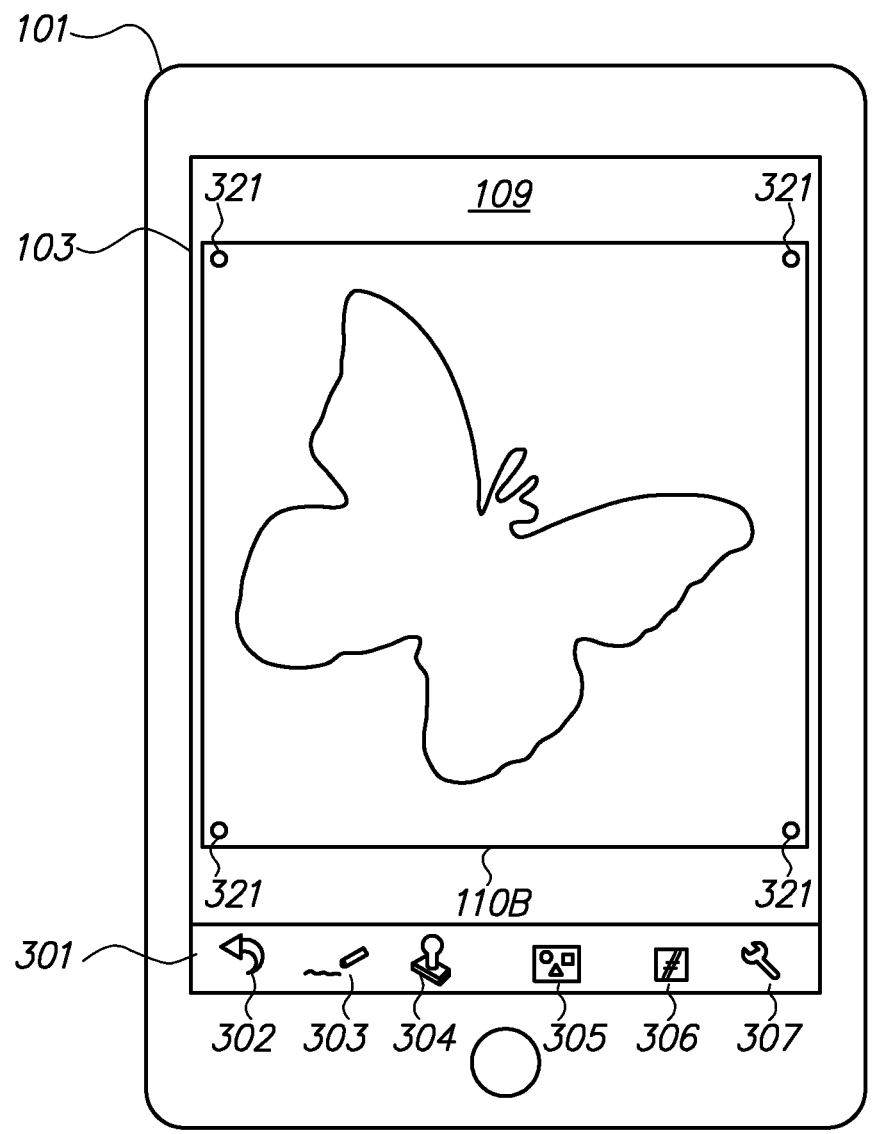
FIG. 3I is a screen shot depicting a stencil for generating a butterfly shape, according to one embodiment.
Figure 3J:
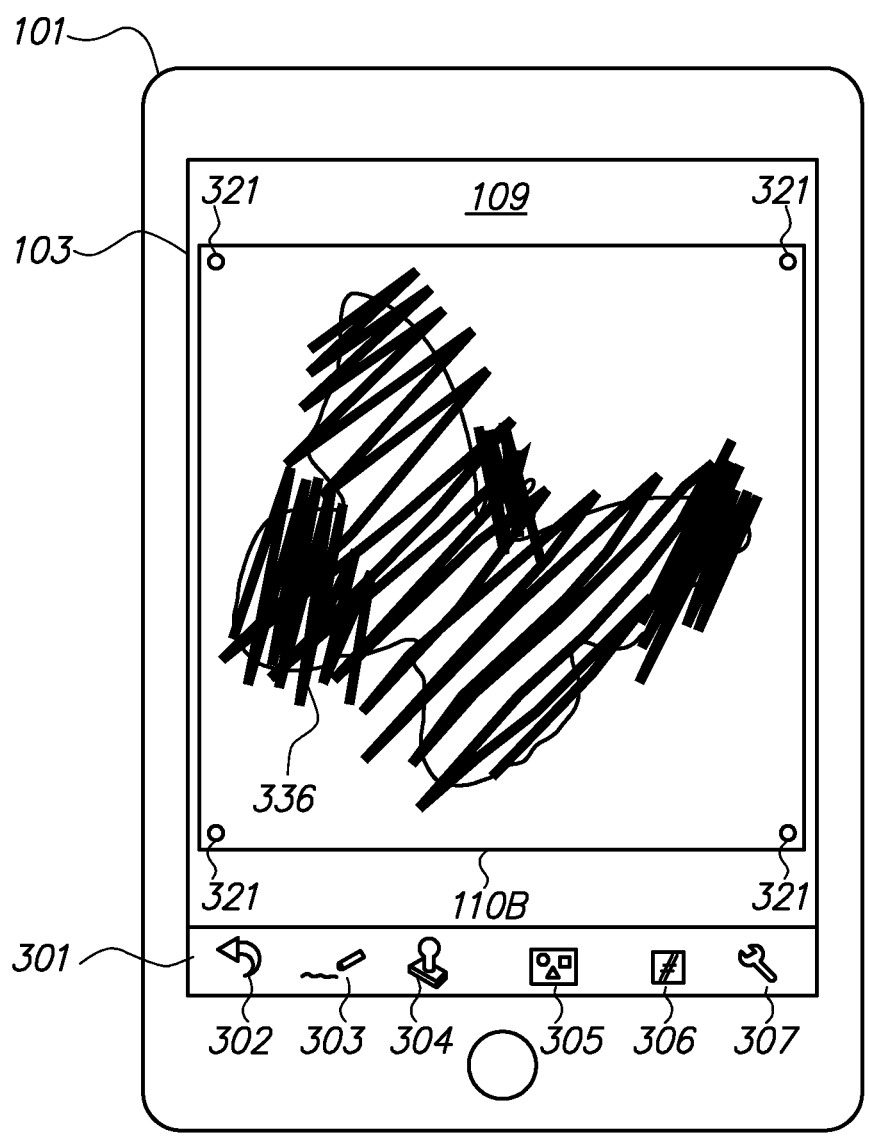
FIG. 3J is a screen shot depicting a user's drawing operation on a graphical document using the stencil for generating a butterfly shape, according to one embodiment.
Figure 3K:
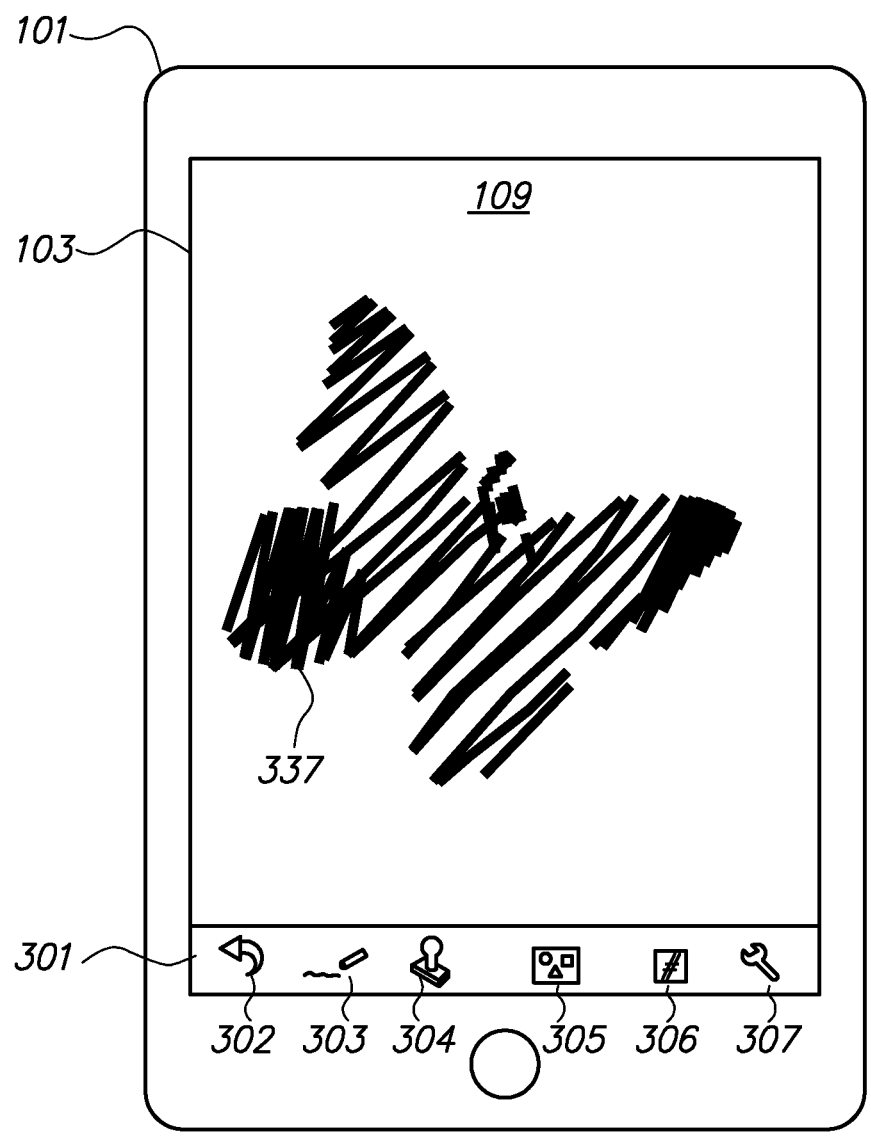
FIG. 3K is a screen shot depicting an example of the graphical document wherein the stencil for generating a butterfly shape has constrained the user's drawing operation, according to one embodiment.

Referring now to FIGS. 3I through 3K, there is shown an example of constraining functionality. FIG. 3I depicts butterfly stencil 110B, which user 100 can size, position, and place as desired on document 109. In FIG. 3J, user 100 has scribbled 336 on document 109. Some of scribbles 336 are within the butterfly shape defined by stencil 110B, and some are outside the butterfly shape. FIG. 3J depicts document 109 after user's 100 drawing operation has been transformed and stencil 110B has been dismissed; what remains is a transformed drawing element 337 representing those portions of scribbles 336 lying within the butterfly shape defined by stencil 110B. Those portions of scribbles 336 extending beyond the butterfly shape have been deleted from document 109.

Thus, the operations depicted in FIGS. 3I through 3K allow user 100 to position stencil 110B, scribble on stencil 110E (and on nearby areas), and dismiss stencil 110B, causing only that part of scribble 336 that lies within the defined butterfly shape to shown in finished graphical document 109.

In this manner, stencils 110 can selectively prevent drawing operations from affecting certain parts of graphical document 109, while permitting the operations from affecting other parts of graphical document 109. Thus, stencil 110 acts as a constraint; user 100 draws freely, but the resulting affected area is the intersection of the target area of the drawing operation with a certain region as defined by the shape of stencil 110.

Stencil 110 can be configured so that the area occupied by the shape defined by stencil 110 is not affected by the drawing or painting operation, while other areas are affected normally. Conversely, stencil 110 can be configured so that only the area occupied by the shape defined by stencil 110 is affected by the drawing or painting operation, while other areas are not affected.

Visual Guide:

In one embodiment, stencils 110 are presented as a visual guide only; user 100 is free to draw as he or she wishes, and stencil 110 has no effect on any drawing operations. Thus, stencil 110 does not perform any transforming or constraining function, but merely assists the user in drawing, for example by helping provide a uniform size and shape, or for helping to draw an approximation of a straight line, polygon, or the like. Some users 100 may prefer such an approach, as it may allow for greater artistic expression and can avoid a sense of artificiality that can result from a constraining or transforming stencil.

In one embodiment, user 100 can specify whether a particular stencil 110 should act as a constraining stencil, a transforming stencil, or as a visual guide only, and can change such configuration as desired. For example, user 100 can select a stencil 110 and then access a preferences command or dialog box where the particular characteristics of stencil 110 (such as its mechanism of operation) can be specified. Alternatively, user 100 can double-tap on stencil 110, or perform some other user input operation to change the characteristics and/or mode of operation of stencil 110.

Manipulation of Stencils

Figure 4A:
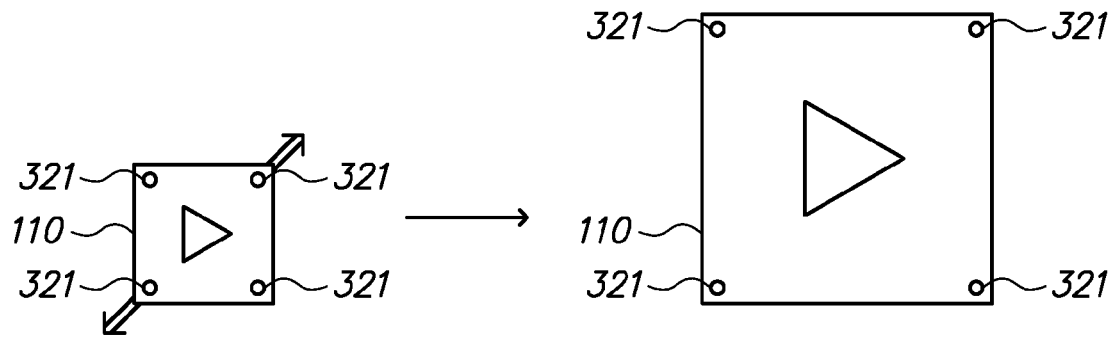
FIGS. 4A through 4C depict examples of user manipulation of a triangle stencil according to one embodiment.
Figure 4B:
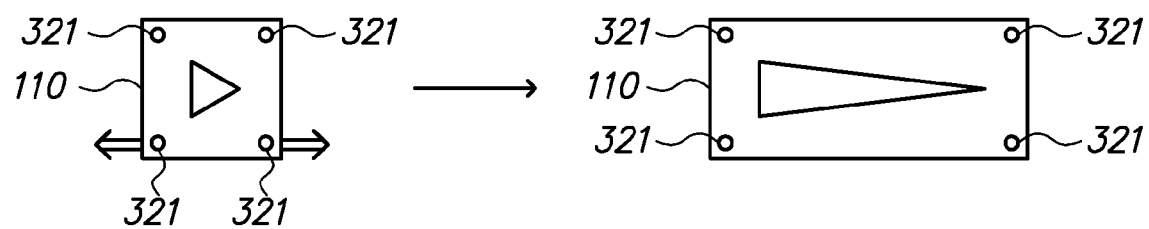
Figure 4C:
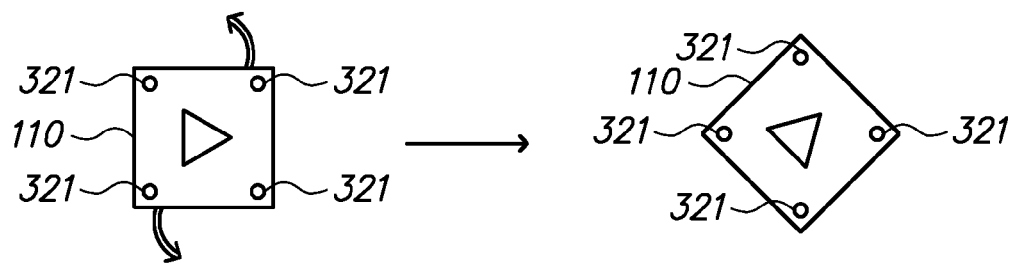

Referring now to FIGS. 4A through 4C, there are shown examples of various types of user manipulation of stencils 110. For illustrative purposes, these examples are shown in connection with a triangle stencil 110 having four handles 321. However, one skilled in the art will recognize that any type of stencil 110 can be similarly manipulated, and that any number of handles 321 (or no handles) can be provided in various embodiments. Stencils 110 can be transformed before and/or after they act to transform or constrain drawing elements.

In FIG. 4A, user 100 drags two diagonally opposed handles 321 in opposite directions (away from each other or toward each other) using multi-touch capability of touchscreen 103. This causes stencil 110 to be resized in proportion to the amount by which handles 321 are dragged.

In FIG. 4B, user 100 drags two handles 321 that are situated on a common side of stencil 110 in opposite directions (away from each other or toward each other) using multi-touch capability of touchscreen 103. This causes stencil 110 to be distorted, for example by stretching it along the axis of relative movement of the handles 321 with respect to one another, in proportion to the amount by which handles 321 are dragged.

In FIG. 4C, user 100 drags two diagonally opposed handles 321 in a counter-clockwise twisting motion using multi-touch capability of touchscreen 103. This causes stencil 110 to rotate by an amount proportional to the amount by which handles 321 are dragged.

Figure 5A:
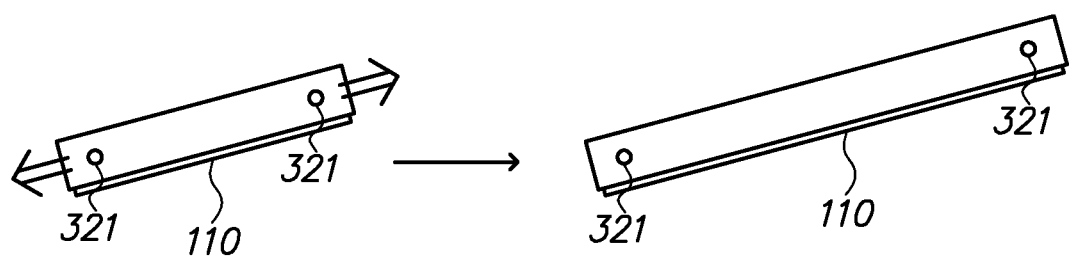
FIGS. 5A and 5B depict additional examples of user manipulation of a straight-edge stencil according to one embodiment.
Figure 5B:
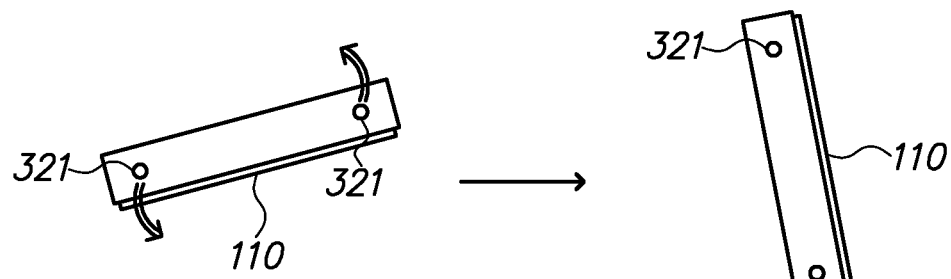

Referring now to FIGS. 5A and 5B, there are shown additional examples of user manipulation of stencils 110. For illustrative purposes, these examples are shown in connection with a ruler stencil 110 having two handles 321. For a ruler stencil 110 that is used as a guide for drawing a straight line, only two handles 321 are needed, since there is no substantive difference between a distortion (resulting in elongation or shortening of the straight edge of stencil 110) and a change in size.

In FIG. 5A, user 100 drags handles 321 in opposite directions (away from each other or toward each other) using multi-touch capability of touchscreen 103. This causes stencil 110 to be distorted, for example by stretching it along the axis of relative movement of the handles 321 with respect to one another, in proportion to the amount by which handles 321 are dragged.

In FIG. 5B, user 100 drags handles 321 in a counter-clockwise twisting motion using a multi-touch capability of touchscreen 103. This causes stencil 110 to rotate by an amount proportional to the amount by which handles 321 are dragged.

In one embodiment, user 100 can combine various manipulations of stencil 110 in one operation. For example, by moving handles 321 apart while also dragging to a new location, user 100 can resize and reposition stencil 110 concurrently. As another example, user 110 can resize, rotate, and reposition stencil 110 in a single operation by moving handles 321 apart (or closer together), dragging to a new location, and twisting the relative positions of handles 321 concurrently.

In one embodiment, substantially instantaneous visual feedback is provided during manipulation of stencil 110, so that user 100 can see stencil 110 being resized, repositioned, and/or rotated as handles 321 are dragged. An undo command can also be made available, allowing user 100 to undo a manipulation (or set of manipulations) of stencil 110.

Purchasing, Creating, and Modifying Stencils

In one embodiment, stencils 110 can be purchased and made available to user 100, either for a particular document 109 or for all documents 109. Stencils 110 can be bundled with a drawing application and/or sold separately. For example, stencils 110 can be delivered on any physical medium, such as a CD, DVD, or other optical or magnetic storage medium, or they can be downloaded over a communications network.

In one embodiment, users 100 can create their own stencils 110. For example, user 100 can draw a shape, and then select a "make stencil" command to cause stencil 110 having that shape to be created. Stencil 110 can then be used, manipulated, uploaded, stored, transmitted, sold, in the same manner as other stencils 110. For example, users 100 can make new stencils 110 available for sale in an "app store" such as the iTunes app store operated by Apple Inc. of Cupertino, Calif.

In one embodiment, users 100 can modify existing stencils 110, for example by embellishing a butterfly or combining elements of two existing stencils 110, to create a new stencil 110. Stencil 110 can then be used, manipulated, uploaded, stored, transmitted, sold, in the same manner as other stencils 110.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, desktop computer, laptop computer, tablet computer, consumer electronic device, television, set-top box, or the like. An electronic device for implementing the present invention may use any operating system such as, for example, MacOS available from Apple Inc. of Cupertino, Calif., or Microsoft Windows 7 available from Microsoft Corporation of Redmond, Wash., or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. On a computing device having a display screen, a method for using a stencil displayed on the display screen as a drawing guide, comprising:
   displaying, on the display screen, a visual representation of a stencil defining a closed shape;
   receiving at least one drawing command to freely draw a graphical element partially within the closed shape and partially outside the closed shape on a graphical document displayed on the display screen;
   displaying the drawn graphical element on the display screen;
   automatically transforming the drawn graphical element by performing at least one step selected from the group consisting of:
      deleting the portion of the drawn graphical element lying outside the closed shape; and deleting the portion of the drawn graphical element lying within the closed shape; and
displaying the transformed graphical element on the display screen.

2. The method of claim 1, further comprising dismissing the visual representation of the stencil from the display screen.

3. The method of claim 1, further comprising outputting a representation of the graphical document, wherein the representation is free of the visual representation of the stencil.

4. The method of claim 1, wherein:
displaying the transformed graphical element comprises replacing the displayed graphical element with the transformed graphical element.

5. The method of claim 1, wherein automatically transforming the drawn graphical element comprises:
detecting a trigger event; and
automatically transforming the drawn graphical element responsive to the trigger event.

6. The method of claim 5, wherein the trigger event comprises at least one selected from the group consisting of:
user completion of a drawing command;
user pausing for at least a predetermined length of time after a drawing command;
user activation of a transformation command; and
user dismissal of the stencil.

7. The method of claim 1, wherein the steps of automatically transforming the drawn graphical element and displaying the transformed graphical element are performed concurrently with receiving the at least one drawing command.

8. The method of claim 1, wherein automatically transforming the drawn graphical element comprises replacing the generated graphical element with a graphical element based on a shape defined by the visual representation of the stencil.

9. The method of claim 1, wherein automatically transforming the drawn graphical element comprises generating a transformed graphical element based on a shape defined by the visual representation of the stencil and further based on the received at least one draws ing command.

10. The method of claim 1, wherein receiving at least one drawing command comprises detecting user contact with a location on the touch-sensitive screen, and wherein a target area for the drawing command is determined based on the location of the user contact.

11. The method of claim 1, further comprising;
displaying a cursor on the display screen;
moving the cursor responsive to user input;
and wherein receiving at least one drawing command comprises detecting user activation of a drawing command, and wherein a target area for the drawing command is determined based on the location of the cursor at the time of user activation of the drawing command.

12. The method of claim 1, further comprising:
receiving, at an input device, user input specifying modification of at least one characteristic of the stencil;
responsive to the user input, modifying the at least one characteristic of the stencil.

13. The method of claim 12, wherein modifying the at least one characteristic of the stencil comprises at least one selected from the group consisting of:
resizing the stencil;
rotating the stencil; and
distorting the stencil.

14. The method of claim 1, wherein automatically transforming the drawn graphical element comprises deleting the portion of the drawn graphical element lying outside the closed shape.

15. The method of claim 1, wherein automatically transforming the drawn graphical element comprises deleting the portion of the drawn graphical element lying within the closed shape.

16. A computer program product for using a stencil displayed on a display screen as a drawing guide, comprising:
a non-transitory computer-readable storage medium; and
computer program code, encoded on the medium, configured to cause a processor to perform the steps of:
causing the display screen to display a visual representation of a stencil defining a closed shape;
receiving at least one drawing command to freely draw a graphical element partially within the closed shape and partially outside the closed shape on a graphical document displayed on the display screen;
causing the display screen to display the drawn graphical element;
automatically transforming the drawn graphical element by performing at least one step selected from the group consisting of:
deleting the portion of the drawn graphical element lying outside the closed shape; and
deleting the portion of the drawn graphical element lying within the closed shape; and
causing the display screen to display the transformed graphical element.

17. The computer program product of claim 16, wherein the computer program code configured to cause a processor to automatically transform the drawn graphical element and display the transformed graphical element are configured to operate concurrently with the computer program code for receiving the at least one drawing command.

18. The computer program product of claim 16, wherein the computer program code configured to cause a processor to automatically transform the drawn graphical element comprises computer program code configured to cause a processor to replace the generated graphical element with a graphical element based on a shape defined by the visual representation of the stencil.

19. The computer program product of claim 16, wherein the computer program code configured to cause a processor to automatically transform the drawn graphical element comprises computer program code configured to cause a processor to generate a transformed graphical element based on a shape defined by the visual representation of the stencil and further based on the received at least one drawing command.

20. The computer program product of claim 16, further comprising computer program code configured to cause a processor to perform the steps of:
receiving, at an input device, user input specifying modification of at least one characteristic of the stencil;
responsive to the user input, modifying the at least one characteristic of the stencil.

21. The computer program product of claim 16, wherein the computer program code configured to cause a processor to automatically transform the drawn graphical element comprises computer program code configured to cause a processor to delete the portion of the drawn graphical element lying outside the closed shape.

22. The computer program product of claim 16, wherein the computer program code configured to cause a processor to automatically transform the drawn graphical element comprises computer program code configured to cause a processor to delete the portion of the drawn graphical element lying within the closed shape.

23. A system for using a stencil displayed on a display screen as a drawing guide, comprising:

a display screen, configured to display a visual representation of a stencil defining a closed shape;

an input device, configured to receive at least one drawing command to freely draw a graphical element partially within the closed shape and partially outside the closed shape on a graphical document displayed on the display screen; and a processor, coupled to the display screen and to the input device, configured to perform the steps of:

causing the display screen to display the drawn graphical element; and automatically transforming the drawn graphical element by performing at least one step selected from the group consisting of:

deleting the portion of the drawn graphical element lying outside the closed shape; and deleting the portion of the drawn graphical element lying within the closed shape;

wherein the display screen is configured to display the transformed graphical element.

24. The system of claim 23, wherein the processor is configured to automatically transform the generated graphical element and to cause the display device to display the transformed graphical element concurrently with the input device receiving the at least one drawing command.

25. The system of claim 23, wherein the processor is configured to automatically transform the drawn graphical element by replacing the generated graphical element with a graphical element based on a shape defined by the visual representation of the stencil.

26. The system of claim 23, wherein the processor is configured to automatically transform the drawn graphical element by generating a transformed graphical element based on a shape defined by the visual representation of the stencil and further based on the received at least one drawing command.

27. The system of claim 23, wherein:

the input device is further configured to receive user input specifying modification of at least one characteristic of the stencil; and responsive to the user input, the processor is configured to modify the at least one characteristic of the stencil.

28. The system of claim 23, wherein the processor is configured to automatically transform the drawn graphical element by deleting the portion of the drawn graphical element lying outside the closed shape.

29. The system of claim 23, wherein the processor is configured to automatically transform the drawn graphical element by deleting the portion of the drawn graphical element lying within the closed shape.

30. On a computing device having a display screen, a method for using a stencil displayed on the display screen as a drawing guide, comprising:

a) displaying, on the display screen, a visual representation of a stencil defining a closed shape;

b) receiving at least one drawing command to freely draw a graphical element, the drawing command being performed partially within the closed shape and partially outside the closed shape, on a graphical document displayed on the display screen; and c) on the display screen, responding to the drawing command by displaying a portion of the drawn graphical element defined by the closed shape, while ignoring a portion of the drawing command pertaining to the remainder of the drawn graphical element.

31. The method of claim 30, further comprising storing a representation of the graphical document, wherein the stored representation comprises a representation of the stencil.

32. The method of claim 30, further comprising storing a representation of the graphical document, wherein the stored representation is free of the stencil.

33. The method of claim 30, further comprising displaying, on the display screen, at least a portion of the graphical document, wherein the displayed visual representation of the stencil overlays at least a portion of the graphical document.

34. The method of claim 33, further comprising:

prior to displaying the at least a portion of the graphical document:

receiving a user command to create a new graphical document; and responsive to the user command, creating a new graphical document;

and wherein displaying the at least a portion of the graphical document is performed responsive to the user command to create a new graphical document.

35. The method of claim 33, further comprising:

prior to displaying the at least a portion of the graphical document:

receiving a user command identifying a previously created graphical document for editing; and responsive to the user command, opening the previously created graphical document;

and wherein displaying the at least a portion of the graphical document is performed responsive to the user command identifying a previously created graphical document for editing.

36. The method of claim 30, further comprising:

prior to displaying the visual representation of the stencil, receiving, at an input device, user input activating the stencil;

and wherein the step of displaying the visual representation of the stencil is performed responsive to receiving the user input.

37. The method of claim 30, further comprising:

prior to displaying the visual representation of the stencil, receiving user input specifying at least one characteristic of the stencil;

and wherein displaying the visual representation of the stencil comprises displaying the visual representation of the stencil having the specified at least one characteristic.

38. The method of claim 30, wherein displaying the visual representation of the stencil comprises displaying the shape defined by the stencil.

39. The method of claim 30, further comprising:

prior to displaying the visual representation of the stencil, receiving user input drawing a shape;

and wherein the visual representation of the stencil is based on the drawn shape.

40. The method of claim 30, further comprising:

prior to displaying the visual representation of the stencil, receiving user input selecting a stencil from a plurality of available stencils.

41. The method of claim 30, wherein step c) comprises displaying a portion of the drawn graphical element lying within the closed shape while ignoring the portion of the drawing command performed outside the closed shape.

42. The method of claim 30, wherein step c) comprises displaying a portion of the drawn graphical element lying outside the closed shape while ignoring the portion of the drawing command performed within the closed shape.

43. The method of claim 30, further comprising dismissing the visual representation of the stencil from the display screen.

44. The method of claim 30, further comprising outputting a representation of the graphical document, wherein the representation is free of the visual representation of the stencil.

45. The method of claim 30, wherein receiving at least one drawing command comprises detecting user contact with a location on the touch-sensitive screen, and wherein a target area for the drawing command is determined based on the location of the user contact.

46. The method of claim 30, further comprising;
displaying a cursor on the display screen;
moving the cursor responsive to user input;
and wherein receiving at least one drawing command comprises detecting user activation of a drawing command, and wherein a target area for the drawing command is determined based on the location of the cursor at the time of user activation of the drawing command.

47. The method of claim 30, further comprising:
receiving, at an input device, user input specifying modification of at least one characteristic of the stencil;
responsive to the user input, modifying the at least one characteristic of the stencil.

48. The method of claim 47, wherein modifying the at least one characteristic of the stencil comprises at least one selected from the group consisting of:
resizing the stencil;
rotating the stencil; and
distorting the stencil.

49. A computer program product for using a stencil displayed on a display screen as a drawing guide, comprising:
a non-transitory computer-readable storage medium; and
computer program code, encoded on the medium, configured to cause a processor to perform the steps of:
a) causing the display screen to display a visual representation of a stencil defining a closed shape;
b) receiving at least one drawing command to freely draw a graphical element, the drawing command being performed partially within the closed shape and partially outside the closed shape, on a graphical document displayed on the display screen; and
c) causing the display screen to respond to the drawing command by displaying a portion of the drawn graphical element defined by the closed shape, while ignoring a portion of the drawing command pertaining to the remainder of the drawn graphical element.

50. The computer program product of claim 49, wherein the computer program code configured to cause a processor to perform step c) comprises the computer program code configured to cause the display screen to display a portion of the drawn graphical element lying within the closed shape while ignoring the portion of the drawing command performed outside the closed shape.

51. The computer program product of claim 49, wherein the computer program code configured to cause a processor to perform step c) comprises the computer program code configured to cause the display screen to display a portion of the drawn graphical element lying outside the closed shape while ignoring the portion of the drawing command performed within the closed shape.

52. The computer program product of claim 49, further comprising computer program code for configured to cause a processor to perform the steps of:
receiving, at an input device, user input specifying modification of at least one characteristic of the stencil;
responsive to the user input, modifying the at least one characteristic of the stencil.

53. A system for using a stencil displayed on a display screen as a drawing guide, comprising:
a display screen, configured to display a visual representation of a stencil defining a closed shape;
an input device, configured to receive at least one drawing command to freely draw a graphical element partially within the closed shape and partially outside the closed shape on a graphical document displayed on the display screen; and
a processor, coupled to the display screen and to the input device, configured to perform the steps of:
a) causing the display screen to display a visual representation of a stencil defining a closed shape;
b) receiving at least one drawing command to freely draw a graphical element, the drawing command being performed partially within the closed shape and partially outside the closed shape, on a graphical document displayed on the display screen; and
c) causing the display screen to respond to the drawing command by displaying a portion of the drawn graphical element defined by the closed shape, while ignoring a portion of the drawing command pertaining to the remainder of the drawn graphical element.

54. The system of claim 53, wherein processor is configured to perform step c) by causing the display screen to display a portion of the drawn graphical element lying within the closed shape while ignoring the portion of the drawing command performed outside the closed shape.

55. The system of claim 53, wherein processor is configured to perform step c) by causing the display screen to display a portion of the drawn graphical element lying outside the closed shape while ignoring the portion of the drawing command performed within the closed shape.

56. The system of claim 53, wherein:
the input device is further configured to receive user input specifying modification of at least one characteristic of the stencil; and
responsive to the user input, the processor is configured to modify the at least one characteristic of the stencil.

* * * * *

UNITED STATES PATENT AND TRADEMARK OFFICE
CERTIFICATE OF CORRECTION

| | |
|---|---|
| PATENT NO. | : 8,896,621 B1 |
| APPLICATION NO. | : 12/792593 |
| DATED | : November 25, 2014 |
| INVENTOR(S) | : Joseph K. Sipher et al. |

It is certified that error appears in the above-identified patent and that said Letters Patent is hereby corrected as shown below:

In the Claims

Column 15, line 39 (claim 9): please replace "draws ing" with "drawing".

Signed and Sealed this
Tenth Day of March, 2015

Michelle K. Lee
*Deputy Director of the United States Patent and Trademark Office*